(12) United States Patent
Pfleging et al.

(10) Patent No.: US 7,738,741 B2
(45) Date of Patent: Jun. 15, 2010

(54) METHOD AND APPARATUS FOR RFID MAPPING TO A DIGITAL CAMERA AND DIGITAL PICTURE DELIVERY SYSTEM

(75) Inventors: Gerald W. Pfleging, Batavia, IL (US); George Paul Wilkin, Bolingbrook, IL (US)

(73) Assignee: Alcatel-Lucent USA Inc., Murray Hill, NJ (US)

( * ) Notice: Subject to any disclaimer, the term of this patent is extended or adjusted under 35 U.S.C. 154(b) by 1063 days.

(21) Appl. No.: 11/407,769

(22) Filed: Apr. 19, 2006

(65) Prior Publication Data

US 2007/0248289 A1    Oct. 25, 2007

(51) Int. Cl.
*G06K 9/54* (2006.01)
*G06K 9/00* (2006.01)

(52) U.S. Cl. ........................ 382/305; 382/100

(58) Field of Classification Search ............... 382/305, 382/306, 100; 348/231.2, 231.3; 713/176; 455/41.2, 41.3
See application file for complete search history.

(56) References Cited

U.S. PATENT DOCUMENTS

| 7,340,214 | B1 * | 3/2008 | Hamberg | 455/41.2 |
| 2004/0075752 | A1 * | 4/2004 | Valleriano et al. | 348/231.3 |
| 2004/0181671 | A1 * | 9/2004 | Brundage et al. | 713/176 |
| 2004/0216039 | A1 * | 10/2004 | Lane et al. | 715/511 |
| 2006/0265508 | A1 * | 11/2006 | Angel et al. | 709/230 |

* cited by examiner

*Primary Examiner*—Yon Couso
(74) *Attorney, Agent, or Firm*—Fay Sharpe LLP

(57) ABSTRACT

This disclosure is a method and system for the linking of digital images to RFID devices. The method includes providing at least one radio frequency identification device, each radio frequency identification device having a electronic product code; linking one or more of the electronic product codes to a digital image file; and storing the linked digital image file into a memory. The disclosure allows users to easily access only images that are linked to their RFID device. Thereby, this disclosure allows a photographer easy access to potential customers while protecting user's privacy.

20 Claims, 4 Drawing Sheets

METHOD AND APPARATUS FOR RFID MAPPING TO A DIGITAL CAMERA AND DIGITAL PICTURE DELIVERY SYSTEM

BACKGROUND OF THE INVENTION

This disclosure relates to a method and apparatus for linking digital images to radio frequency identification (RFID) devices. More particularly, it relates to a method and system for the configuration of mapping digital images to a digital camera and a digital image delivery system.

While the disclosure is particularly directed to the art of linking RFIDs to individual digital images, especially where digital cameras have the capabilities to handle such linking, either through attached RFID readers or through RFID readers connected through the universal serial bus (USB) and thus will be described with specific reference thereto, it will be appreciated that the example embodiments disclosed herein may have other useful fields of application. For example, the teaching of the disclosure may be used for the linking of general media devices to RFIDs.

By way of background, RFID is an automatic identification method that uses radio frequency to transmit identification data to a reader. One major advantage of RFID is that there is no line of sight requirement. The transmitter can be read by a reader whenever the transmitter is in a sufficient proximity to the reader.

There has been a trend among photographers to use digital photography equipment. This has particularly been the case among professional contract photographers that work venues such as wedding halls, cruise ships and amusement parks. During cruises and in amusement parks, these photographers typically take pictures, print them and load them on to a viewing area, such as a centrally located wall, where people interested in purchasing the pictures may search through the pictures and purchase the ones that interest them. However, many people do not have their pictures taken, because they do not want pictures of themselves on general display. When people do agree to have their picture taken, but do not purchase them, the photographers create a large amount of waste. In this regard, they expend recourses printing photos that will never be purchased and, oftentimes are never viewed. Furthermore, photographers may be in possession of pictures or picture images that a customer may be interested in purchasing; however, photographers often times do not have access to these potential customers. These photographers may use paper identification and/or tagging systems in order to link an individual to their particular photo and/or set of photos. However, with traditional methods, the linking may take a considerable amount of time and organization.

Therefore, there is a need in the industry for an improved system and method that links a potential customer to their set of photographs that they may be interested in purchasing. Furthermore, there is a need for such a system and method to allow for high accessibility for the potential customers. In addition, the system and method must allow photographers to quickly link the potential customers to their individual set of photos and further restrict the general public from having access to these very same digital images.

The present disclosure contemplates a new and improved system and method for resolving the above-referenced difficulties and others.

SUMMARY OF THE INVENTION

A method and system for RFID mapping for a digital image capturing device and digital picture delivery system is provided.

In one aspect of the presently described embodiments, a method of linking a digital image to an RFID device comprises providing at least one radio frequency identification device, each radio frequency identification device having an electronic product code linking one or more of the electronics product codes to a digital image and storing the linked digital image in a memory.

In another aspect of the presently described embodiments, the method includes storing at least one of the electronic product codes in a picture taking device.

In another aspect of the presently described embodiments, the method includes embedding the picture with non-visible identification information.

In another aspect of the presently described embodiments, the method includes adding the electronic product codes to an exchangeable image file (EXIF) associated with the picture.

In another aspect of the presently described embodiments, the method includes processing restrictions to a file associated with the digital image.

In another aspect of the presently described embodiments, the method includes organizing the electronics product codes into a hierarchal structure.

In another aspect of the presently described embodiments, the system comprises a radio frequency identification device having an electronics product code, a radio frequency identification device reader that is configured to read the electronics product code from the radio frequency identification device and a linking module configured to link the red electronics product code to a digital image.

In another aspect of the presently described embodiments, the system includes a digital camera configured to record digital images and configured to access the linking module.

In another aspect of the presently described embodiments, the system includes a digital image delivery application which would include a display configured to allow users to view the digital images that are linked to their radio frequency identification device.

In another aspect of the presently described embodiments, the system includes a distribution module configured to distribute the linked digital image files to said digital image file delivery application.

In another aspect of the presently described embodiments, the system includes the digital image delivery application, including a purchasing terminal.

In another aspect of the presently described embodiments, the system includes the digital image delivery application that includes a printer.

In another aspect of the presently described embodiments, the system includes the digital image delivery application that is a web based system.

In another aspect of the presently described embodiments, the system includes a digital image delivery application configured for internet protocol television-type functionality.

In another aspect of the presently described embodiments, the method includes providing at least one radio frequency identification device, each radio frequency identification device having an electronic product code, reading one or more of the electronics product code from the radio frequency device using a radio frequency identification reader, storing one or more of the electronics product code linking one or more of the electronics product code to a digital image, and routing the linked digital image to a digital image delivery application.

In another aspect of the presently described embodiments, the method includes routing the linked digital images to a digital image delivery application that is a web based system.

In another aspect of the presently described embodiments, the method includes routing the linked digital images to a digital image delivery application that includes a kiosk viewing location configured to accept the radio frequency identification device and present digital images that are linked to the electronics product code associated with the radio frequency identification device.

In another aspect of the presently described embodiments, the method includes routing the linked digital images to a digital image delivery application where the digital image delivery application is configured for viewing on a video system using internet protocol television type functionality.

Further scope of the applicability of the present disclosure will become apparent from the detailed description provided below. It should be understood, however, that the detailed description and specific examples, while indicating exemplary embodiments of the disclosure, are given by way of illustration only, since various changes and modifications within the spirit and scope of the invention will become apparent to those skilled in the art.

DESCRIPTION OF THE DRAWINGS

The present invention exists in the construction, arrangement, and combination of the various parts of the device, and steps of the method, whereby the objects contemplated are attained as hereinafter more fully set forth, specifically pointing out in the claims, and illustrated in the accompanied drawings in which:

DETAILED DESCRIPTION OF THE PREFERRED EMBODIMENTS

Figure 1:
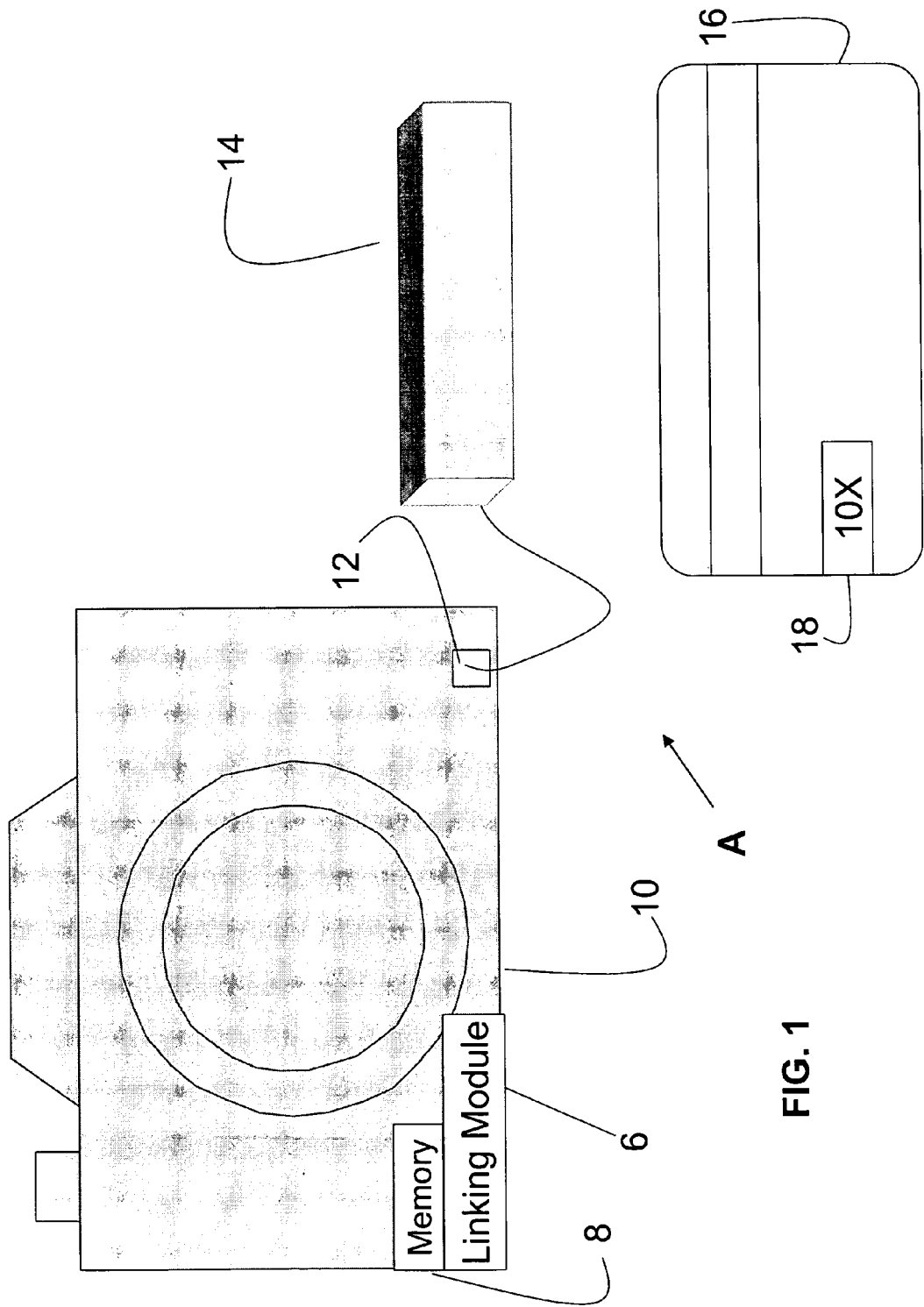
FIG. 1 illustrates a portion of the system including a camera, an RFID reader, an RFID device and an LEPC.

Referring now to the drawings wherein the showings are for purposes of illustrating exemplary embodiments of the invention only and not for purposes of limiting same, FIG. 1 provides a view of an exemplary system into which the invention may be incorporated. The system A is shown. The system A includes a digital image capturing device 10 and associated RF reader 14, an RFID card 16, and an electronics product code (EPC) 18.

In operation, as described in greater detail below, the presently described embodiments include a method for linking a digital image to an RFID device. In this sense, a photographer can link a photograph and/or digital picture file to potential customers that are associated with the RFID device quickly and efficiently. Consequently, people will not have their pictures on display for the public to view. Furthermore, photographers will not waste time and resources printing pictures which will ultimately not be purchased.

Still referring to FIG. 1, in one form, a potential customer is given an RFID device 16. In FIG. 1, the RFID device is represented by card 16. However, it should be appreciated that an RFID system can be implemented on numerous devices. Although cards are often used to house the RFID tag, or transponder, many devices can be substituted for a card and still remain within the spirit of the disclosure. For example, a key chain party favor or a piece of jewelry may also be used. Furthermore, the RFID device can also be used for alternative purposes. For example, the RFID device may primarily be used as a debit/credit card while at the venue. It could also be used as a room key.

The RFID card has an EPC 18 which is a code that identifies the RFID user. In this embodiment, each RFID card 16 has its own unique EPC 18. In such a case, each potential customer would have their own EPC 18 so that each potential customer can be identified individually. However, it should be appreciated that it may be advantageous to assign a common EPC to customers that are similarly situated. In this form, each user with the same EPC will have the same opportunities to view the same group of digital images. For example, each of the immediate family members at an extended family reunion may share one EPC, but have his or her own RFID device.

At a party or event, a photographer can provide cards with information received from the planners for each attendee. For example, at a wedding, a wedding planner may use RFID cards 16 as traditional table cards. In whatever instance, the attendee would keep the cards with them throughout the event, and when a wedding photographer was ready to take a picture, the wedding photographer would allow the cards 16 to be read by the RF reader 14. The RF reader 14 would then link the EPC 18 of at least one RFID card to the picture or pictures that are taken.

In the embodiment shown, the EPC is a series of numbers for illustrative purposes. However, the EPC tag can be read by radio frequency scanners and, therefore, the EPC can be any type of identifier, not limited to numbers and/or letters.

FIG. 1 also shows an image capturing device 10 that has a memory 8 for storing images, and is in communication with an RFID reader 14 through a connection, such as USB connector 12. It should be appreciated that many common digital image capturing devices 10 contain USB ports, however, the RFID reader 14 does not necessarily need to be an external device connected through the USB port 12. For example, the digital picture taking device 10 may be manufactured with an internal RF reader 14. It should be noted that RF readers 14 are well known in the art, and a variety of internal and/or external RF readers may be implemented into the system A.

The image capturing device 10 houses a linking module 6 which links the pictures 20 (FIG. 2), to an RFID 16. However, the linking module 6 could also be housed in the RF reader 14 or some other external device.

FIG. 1 also shows a digital camera as the image capturing device 10; however, the device should not be so limited. Any image capturing device may be used. In one form, it may be a digital video device wherein the images are not limited to still pictures. Mobile phones may also have suitable image capturing capability.

After the pictures are taken by the photographer, there could be several methods in which to clear the data from the image capturing device 10. For example, the image capturing device 10 could have a "clear" button, a timer, and/or a picture limit programmed or set into the image capturing device 10, or the EPCs could be cleared from the camera by simply energizing and retrieving information from a new RFID card 16. The controls in the image capturing device 10 and/or RF reader 14 would be programmed to allow for the retrieval of multiple RFIDs 16 per picture. In this form, pictures can be linked to multiple RFID cards, and in turn, RFID card users. Furthermore, the system allows for tagging pictures that are stored on the image capturing device 10 and/or tagging pictures that have already been taken by the device 10. For example, a photographer can have the RFID reader 14 read the RFID cards 16, and then take a picture and have that picture be tagged to the RFID cards 16. In the alternative, the photographer can take the picture first and then have the RFID cards 16 read by the RF reader and still have those pictures be tagged.

Figure 2:
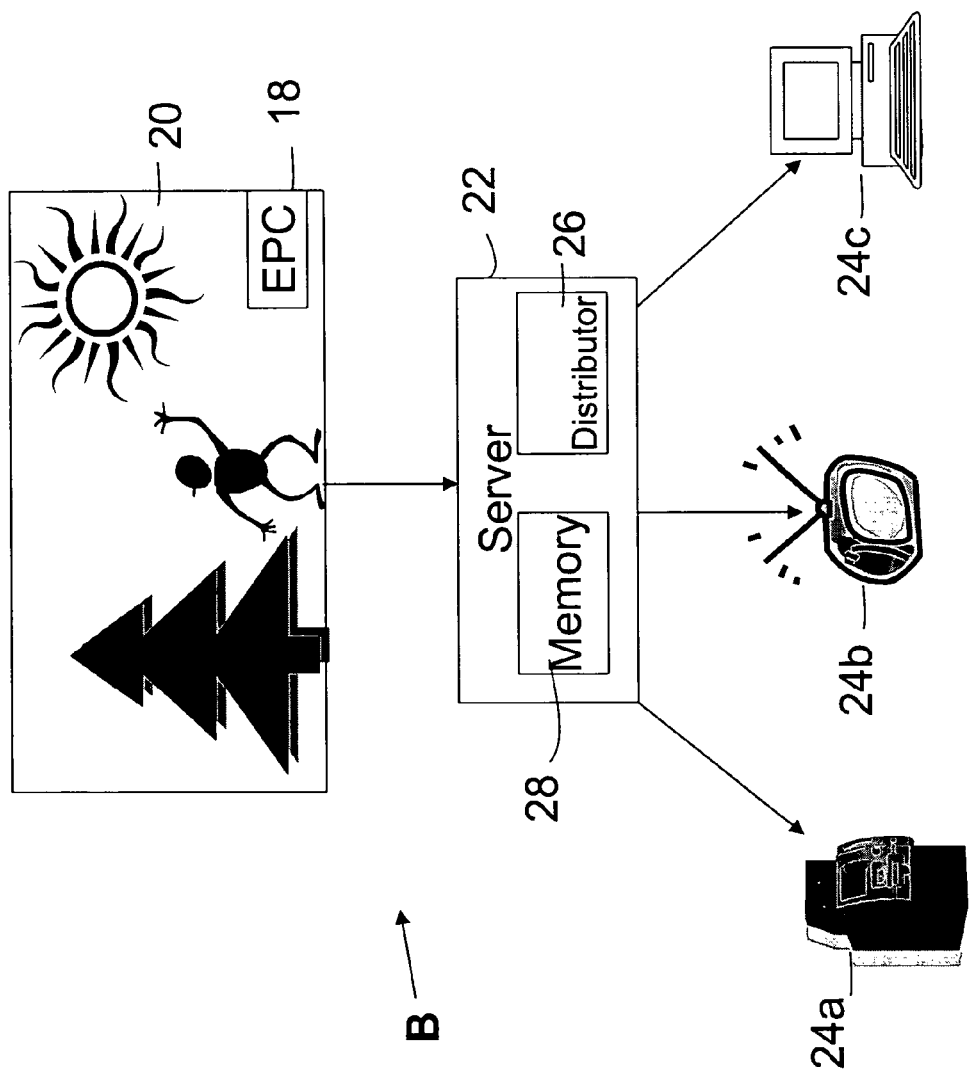
FIG. 2 illustrates another portion of the overall system including a digital image photograph, a server system, and various digital image delivery applications.

Now referring to FIG. 2, an extension of the system A is shown at B. The system includes a digital image 20, along with a server system 22 and a digital image delivery application 24A, 24B, 24C.

The digital image 20 is tagged with the corresponding EPC 18. The EPC 18 may contain restrictions, such as, who may view the image, and/or who may print the image. The EPC 18 may also contain information as to where the digital image 20 will be routed in order to be viewed. The digital image 20 may be a printed photograph, a photograph stored in media, a movie and/or other type of digital media.

The digital image file 20 will then be transmitted to a server system 22 which contains a memory 28 and a distribution module 26. The server is adapted to read the EPC 18 of each digital image file 20. Because the pictures are tagged with an EPC 18, which contains specific instructions for each digital image file 20, it can be routed using the server system 22 to a picture delivery application 24A, 24B, 24C. The distribution module 26 is configured to send each digital image file 20 to its proper digital image delivery application 24A, 24B, 24C.

The digital image delivery application 24A, 24B, 24C may contain a variety of elements. These elements include, but are not limited to a printer for printing the purchased digital images, a media writer such as a CD and/or DVD burner for storing the images, a display for viewing stored digital images, and/or a purchasing terminal for accepting currency in which to purchase digital images.

In one embodiment, the RFID card 16, (FIG. 1) is configured to be compatible with a kiosk digital image delivery application 24A. In this embodiment, kiosk viewing is enabled through the use of the RFID card 16. A user would use the RFID card 16 provided to them in order to view all photos linked to that RFID card 16. The kiosk 24A is configured to read the RFID card 16 and query the system to present any digital images 20 that are tied to that ID or, in the hierarchy of that ID. The user can then either print out the purchased picture, have them burned onto media storage and/or retrieve the pictures/files by some other method.

In another embodiment, the digital image delivery application is configured for internet protocol, television functionality 24B. For example, if the event is on a cruise, then the RFID server system 22 would send the digital image files and/or photographs 20 directly to the potential customer room so that it may be viewed on an internet protocol television 24B. In this instance, digital images may be purchased and added to the account of the user.

In another embodiment, the digital image delivery application is a web based system 24C. In this instance, a potential customer may be given a password that may be entered on a website. In this embodiment, the user can purchase the pictures from the corresponding website. Furthermore, they could be burned on to a media storage device such as a CD or DVD or sent to the users email account.

These are but some examples of digital image delivery applications. Other digital image delivery applications may be substituted and still be within the spirit of the presently described embodiments.

Figure 3:
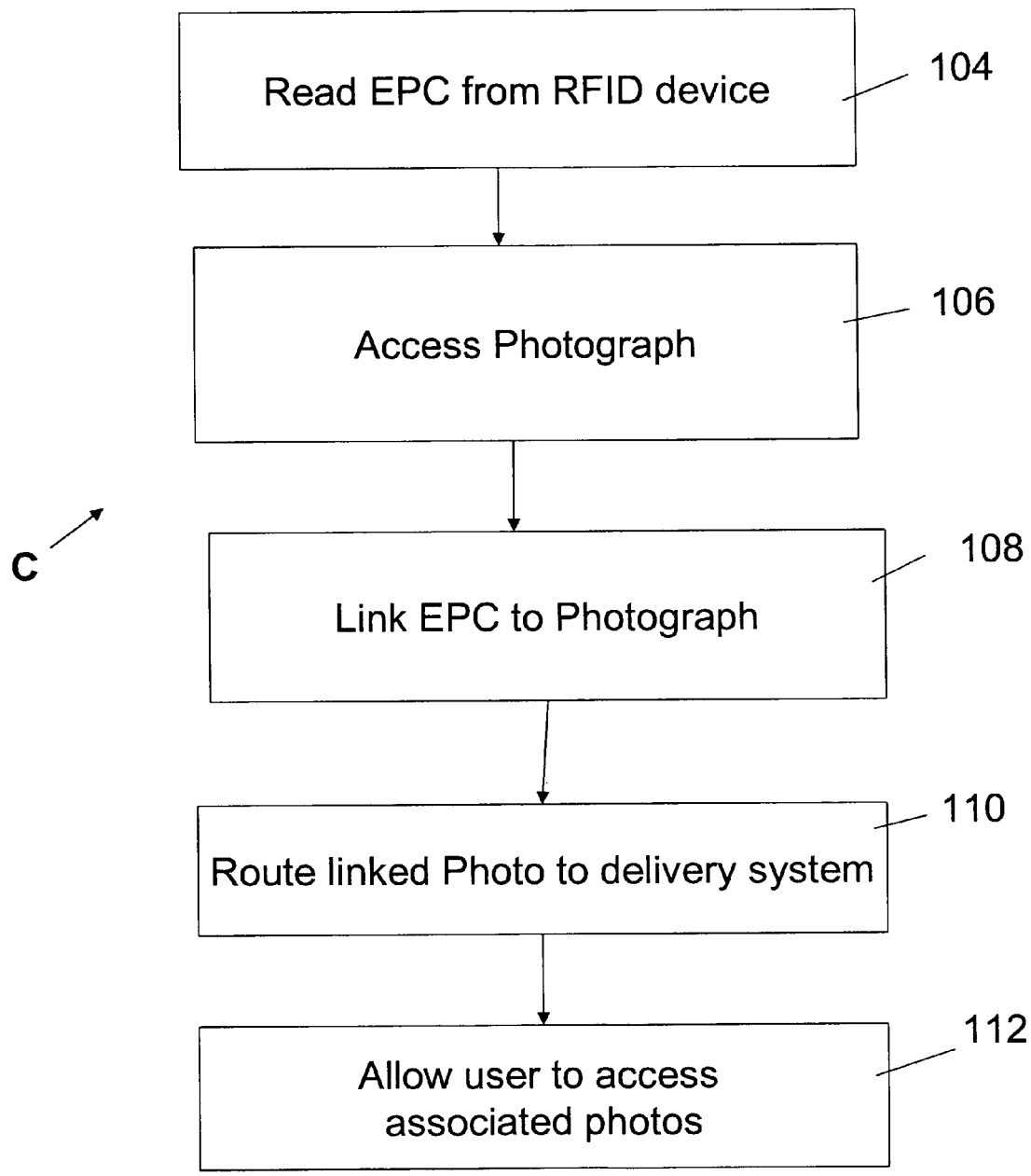
FIG. 3 is a flow chart illustration of the method according to the present disclosure.

Referring now to FIG. 3, a method of linking a digital image to an RFID device is shown generally (at C). It should be understood that the method may be implemented in a variety of software and hardware configurations. In one form, the software implementing the method of FIG. 3 resides in the digital image capturing equipment 10, FIG. 1. In another form, the software implementing the method of FIG. 3 resides in the RF reader 14. In yet another form, the software implementing the method of FIG. 3 resides in the server system 22. In yet another form, software implementing the method of FIG. 3 is distributed throughout the many network elements.

As shown, the method C includes reading an EPC from an RFID device (at 104). An RFID device 16 has an EPC 18 (FIG. 1). The RFID device 16 can be read by an RF reader 14. The RF reader 14 then will store the EPC 18 which in turn will be used to identify which RFID device 16 was read.

The method continues with accessing a digital image (at 106). A digital image will be taken by the image capturing device 10, either slightly before or after the RFID device 16 was read. Whichever digital image that RFID should be linked to will be accessed.

The method continues with the step of linking the EPC to a digital image (at 108). The EPC 18 will then be linked to the corresponding digital image where it was taken in close proximity in time to when the RFID device 16 was read. The EPC 18 can also have certain restrictions pertaining to that particular code, in which case it may allow pictures to be viewed, purchased and/or printed by some or all of the potential customers. The EPC 18 can also be embedded into the digital image with non-visible identification information or be stored in the EXIF of the picture file. The linking of the digital image file and/or photograph can help trace the purchaser, viewer and/or printer of that digital image. The EPC 18 can even be used to trace back to anyone who has manipulated that digital image.

The method continues with routing the linked digital image to a digital image delivery application (at 110). The EPC 18 (FIGS. 1 and 2) may further contain information that will route the digital image file 20 to a digital image delivery system 24A, 24B, and 24C. The digital image may be routed to any particular digital image delivery application, depending on the functionality of the system that is in place.

The method concludes with allowing users to access the digital images linked to their RFID device (at 112). For example, a photographer may be at a wedding where he or she has set up a kiosk in order that the attendees of the wedding may possibly view, print and/or purchase the pictures that day. In this instance, the photographer can sell pictures without having to access the personal information of the attendees. In another example, that same photographer may set up a web based photo delivery application in which the photographer may distribute the website address in which individuals may view, purchase, print and/or burn the photos onto a CD via the internet.

Figure 4:
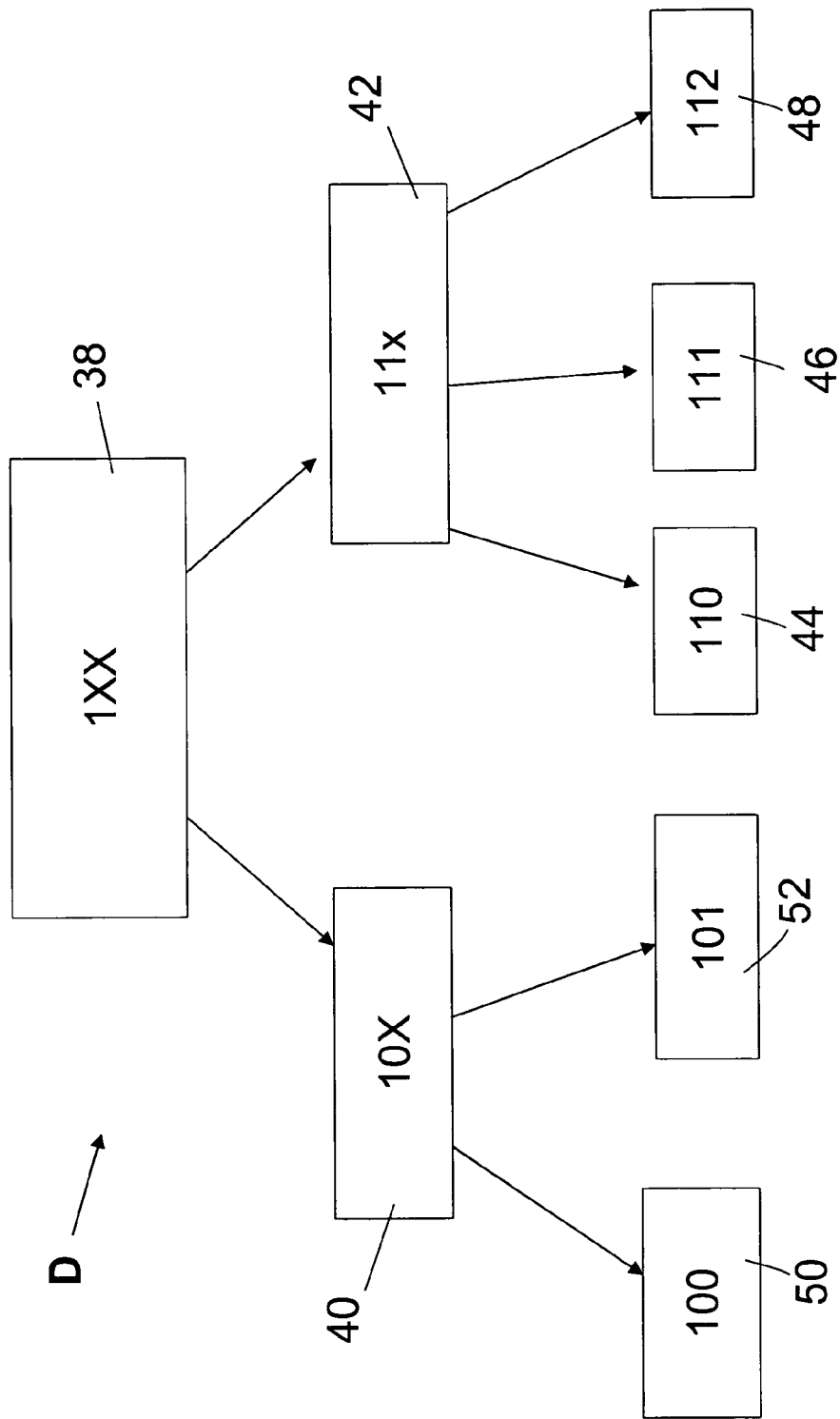
FIG. 4 is a hierarchal structure of the electronics product code.

Now referring to FIG. 4, a representative hierarchical system is shown generally at D. The system represents a hierarchical structure of EPCs 18 (FIG. 1) that may be linked to an RFID device 16 (FIG. 1). The EPC 38 is labeled 1XX. This label is for illustrative purposes only. An EPC maybe any combination of symbols in order to identify the RFID that corresponds to that EPC. In FIG. 4, 1XX corresponds to an EPC that may see any digital image with an EPC that begins in 1. In this hierarchical example, the EPC 38 can view all other digital images. In one embodiment, this EPC could correspond to a bride and groom at a wedding that may be purchasers of all digital images taken. It could also correspond to the photographer, who also would be able to view all digital images taken at the event.

Continuing down the chain, the EPC that is labeled 40 has the corresponding symbol 10X. In this example, the EPC 40 may view all digital images below it which begin in 10. However, the user that has that EPC may not view EPC 42, 44, 46, or 48 because their EPC labels begin with 11, and do not begin with 10. However, EPC 40 could view the digital images that are viewable by EPC labeled 100 and 101. In this example, EPC 40 could belong to a parent whose children have EPC 50 and 52. Therefore, the person who has RFID card EPC 40 could view the digital images that their children can view, however, no other digital images are viewable by this EPC. The same situation would hold true for EPC 40, which is labeled 11X, whose children may have EPC 44, 46, or 48.

Each of these EPCs could also contain restrictions that are specific to their particular EPC. For example, if a bride and groom purchased a package where they could print all pictures at their wedding, they may have EPC No. 38 and this particular EPC may have no restrictions on printing. However, it is possible that a digital photographer may want to protect his copyright and not allow manipulations on any pictures taken at the event. In such a case, the photographer may allow printing, but not manipulations by EPC No. 38. However, if the owner of EPC 48 purchased the copyrights to their pictures, they may be able to manipulate the pictures that they can view, while the user of EPC 38 can only view and print all pictures, but not manipulate any pictures.

The above description merely provides a disclosure of particular embodiments of the disclosure and is not intended for the purposes of limiting the same thereto. As such, the invention is not limited to only the above-described embodiments. Rather, it is recognized that one skilled in the art could conceive alternative embodiments that fall within the scope of the invention.

We claim:

1. A method of linking a digital image file to a radio frequency identification (RFID) device comprising:
   providing at least one radio frequency identification device, each RFID device having an electronic product code;
   linking one or more of said electronic product codes to a digital image file;
   adding processing restrictions to a file associated with said digital image file; and
   storing said linked digital image file in a memory.

2. A method according to claim 1, further comprising storing at least one of said electronic products codes in an image capturing device.

3. A method according to claim 2, further comprising clearing at least one of said stored electronic products codes from said image capturing device.

4. A method according to claim 1, wherein linking said electronic products code to a digital image file includes embedding said digital image file with non visible identification information.

5. A method according to claim 1, wherein linking said electronic products code to a digital image file includes adding said electronic product code to an exchangeable image file associated with said digital image file.

6. A method according to claim 1, further comprising routing said stored digital image file to a storage based at least in part upon said linked electronic products code.

7. A method according to claim 1, further comprising routing said stored digital image file to a digital image file delivery application, wherein said digital image file delivery application includes a display for viewing said stored digital image file.

8. A method according to claim 1, further comprising organizing said electronic products codes in a hierarchal structure.

9. A system for linking a digital image file to an RFID device comprising:
   a radio frequency identification device having an electronic product code;
   a radio frequency identification device reader configured to read said electronic product code from said radio frequency identification device; and
   a linking module configured to link said read electronic products code to a digital image file, the linking module adds processing restrictions to a file associated with said digital image file.

10. A system according to claim 9 further comprising a digital image file delivery application including a display configured to allow users to view said digital image file that are linked to said radio frequency identification device.

11. A system according to claim 10 further comprising a distribution module configured distribute said linked digital image files to said digital image file delivery application.

12. A system according to claim 11 wherein said digital image file delivery application includes a purchasing terminal.

13. A system according to claim 11 wherein said digital image file delivery application includes a printer.

14. A system according to claim 11 wherein said digital image file delivery application is a web based system.

15. A system according to claim 11 wherein said digital image file delivery application is configured for internet protocol television type functionality.

16. A method of linking a digital image file to a radio frequency identification (RFID) device comprising:
   a) providing at least one RFID device, each RFID device having an electronic products code;
   b) reading one or more of said electronic products codes from the RFID device using an RFID reader;
   c) storing one or more of said electronic product code;
   d) linking one or more of said electronic products codes to a digital image file;
   e) adding processing restrictions to a file associated with said digital image file; and
   f) routing said linked digital image file to a digital image file delivery application.

17. A method according to claim 16, wherein said routing said linked digital image file to a digital image file delivery application further includes routing said linked digital image file to a web based digital image file delivery application.

18. A method according to claim 16, wherein said routing said linked digital image file to a digital image file delivery application further includes that said digital image file delivery application comprises a kiosk viewing location configured to accept said radio frequency identification device and present said digital image files that are linked to the electronic products code associated with said radio frequency identification device.

19. A method according to claim 16, wherein said routing said linked digital image file to a digital image file delivery application further includes that said digital image file delivery application is configured for viewing on a video system using internet protocol television type functionality.

20. A method according to claim 16, wherein the electronic product code is added to an exchangeable image file associated with the picture.

* * * * *